UNITED STATES PATENT OFFICE.

CARL HERMANN VOIGT, OF PEGAU, SAXONY, GERMANY.

PROCESS OF PREPARING FOOD FOR ANIMALS.

SPECIFICATION forming part of Letters Patent No. 336,965, dated March 2, 1886.

Application filed July 1, 1885. Serial No. 170,432. (No specimens.)

*To all whom it may concern:*

Be it known that I, CARL HERMANN VOIGT, residing at Pegau, Saxony, Germany, have invented a new and Improved Process of Preparing Food for Animals, of which the following specification is a full, clear, and exact description.

This invention relates to a process of regaining fodder from the waste products obtained in the manufacture of straw-board, cellulose, &c.

It consists of the elements of improvement hereinafter more fully pointed out.

Straw consists of about sixty per cent. of cellulose, which constitutes the fundamental material of its structure, and of about forty per cent. of soluble matter interposed between the cells, and consisting of carbon hydrates, proteids, &c. The latter substances, from the nutritious part of the straw fed to animals, are readily assimilated by the animal system and transformed into flesh and fat. In the manufacture of straw-board and cellulose from straw (also from wood) by the treatment with soda, these nutritious substances are dissolved by the alkaline liquid; and the object of the invention is to regain them in the form of press-cakes as a useful article of fodder for animals, in the following manner:

The process of digestion being completed, the remaining alkaline liquid containing organic substances is neutralized with sulphuric acid, whereby sodium sulphate is formed, and, with the exception of some little coloring-matter, all the organic substances held in solution by the alkaline liquid are precipitated as a very fine precipitate, which by the filter-press is separated from the solution of sodium sulphate. It is then lixiviated with water, pressed a second time, and dried in the form of press-cakes, in which form it is supplied to the trade.

The product thus prepared is of pleasant taste and flavor, reminding one of fresh hay. It is liked by horses and cattle. Owing to the fineness of the precipitate and its very nourishing constituents it is readily assimilated by the animal system.

The sodium sulphate remaining in the solution is regained in the well-known manner by evaporation and crystallization.

I do not claim to have invented the process of preparing food, which consists in mixing straw with water saturated with soda or alum, disintegrating the chaff, forming a cake of alternate layers of chaff and flour, and in medicating the mucilaginous layers by intermixture with sulphur and niter, as such process is described in English Patent No 3,433 of 1866; but

What I claim as my invention is—

The process of regaining the nutritious substances contained in the liquids obtained by treating straw or similar substances with alkalies, which consists in neutralizing such liquids with sulphuric acid, thereby forming alkaline sulphate, and precipitating the organic matters, and in separating the precipitate from the liquid and lixiviating it with water, substantially as specified.

In testimony whereof I have signed my name to this specification in the presence of two subscribing witnesses.

CARL HERMANN VOIGT.

Witnesses:
 EDMUND BACH,
 MORITZ SPREER.